United States Patent [19]

Kurahashi

[11] 4,065,007
[45] Dec. 27, 1977

[54] ARTICLE DELIVERY AND UNLOADING DEVICE

[76] Inventor: Yutaka Kurahashi, c/o Tokyo First Factory, Ishikawajima Harima Jukogyo Kabushiki Kaisha, 1-1 2-chome, Tsukuda, Chuo, Tokyo, Japan

[21] Appl. No.: 678,817
[22] Filed: Apr. 21, 1976
[51] Int. Cl.² .................................................. B65G 67/24
[52] U.S. Cl. .................................... 214/62 A; 104/166
[58] Field of Search ....................... 214/62 R, 62 A, 61, 214/58, 59 R, 59 A, 60, 61; 104/166, 167, 130; 105/241 R, 270, 241 C, 242, 272

[56] References Cited
U.S. PATENT DOCUMENTS

| 961,493 | 6/1910 | Gutenkunst | 214/61 |
| 994,071 | 5/1911 | Fitzgerald et al. | 214/61 |
| 1,020,047 | 3/1912 | Nelson | 214/61 |
| 1,368,289 | 2/1921 | Post | 214/59 R |
| 1,672,041 | 7/1927 | Schomhl et al. | 105/270 |
| 1,774,863 | 9/1930 | Young | 214/59 |
| 3,118,393 | 1/1964 | Ohlin | 104/166 |
| 3,356,040 | 12/1967 | Fonden | 104/130 |
| 3,903,810 | 9/1975 | Jones | 104/166 |

Primary Examiner—Robert J. Spar
Assistant Examiner—Lawrence E. Williams
Attorney, Agent, or Firm—Seidel, Gonda & Goldhammer

[57] ABSTRACT

A vehicle adapted to be conveyed along a track has an upper platform for supporting an article thereon. The platform is adapted to be inclined selectively to one side or the other of the track allowing the article being carried to slide off the vehicle into a chute but is maintained in the horizontal position by a locking device. As the vehicle approaches an unloading chute, the locking device is automatically unlocked and the platform is pivoted to one of its two inclined positions.

16 Claims, 5 Drawing Figures

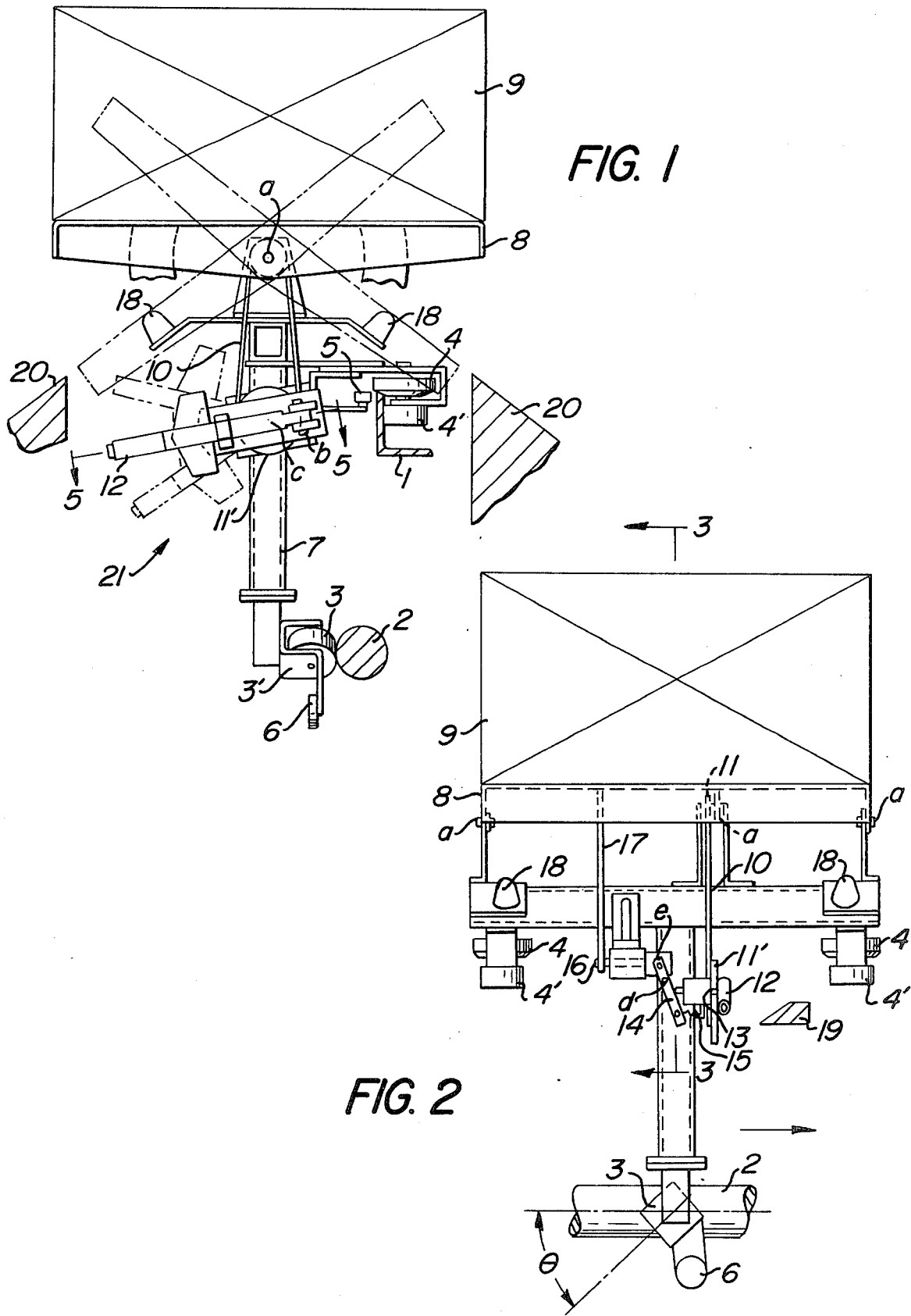

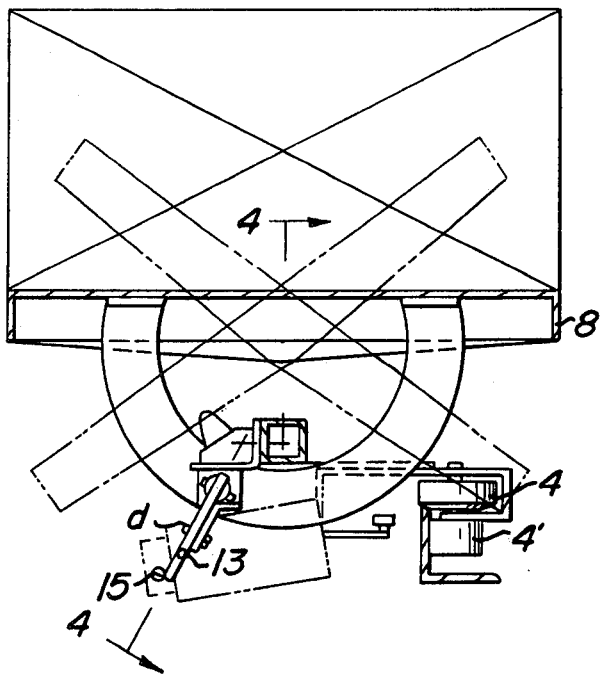
FIG. 3
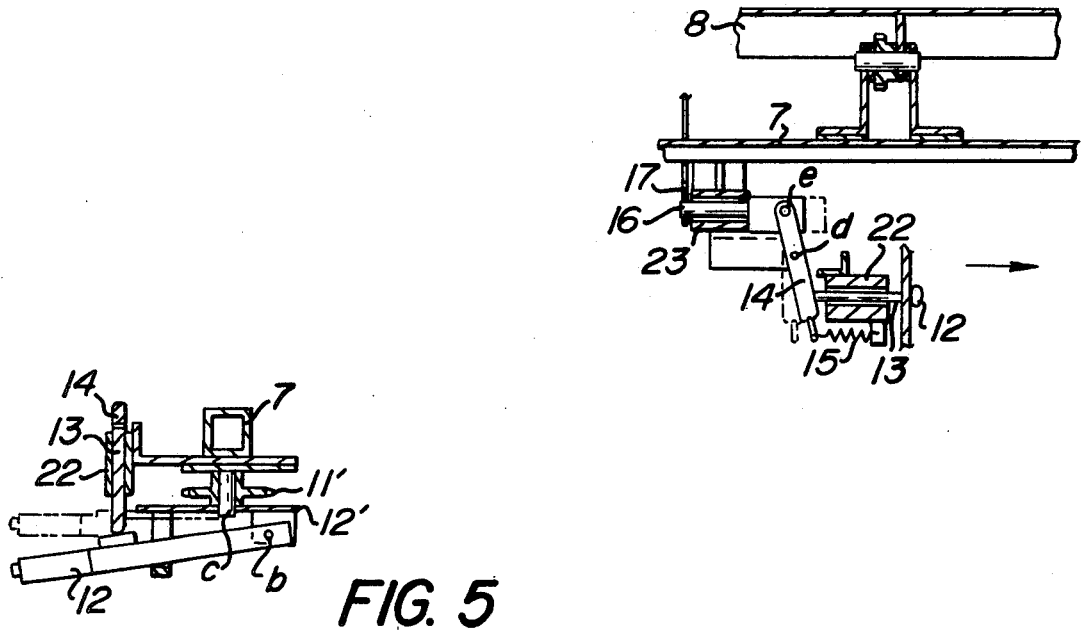
FIG. 4
FIG. 5

ARTICLE DELIVERY AND UNLOADING DEVICE

BACKGROUND

The subject matter of the present invention relates to a vehicle and/or system of the type disclosed in U.S. Pat. Nos. 3,903,810; 3,118,393 and 3,356,040.

The present invention is an improvement on the type of vehicle and the type of unloading device for unloading articles from the vehicle.

This invention is directed to an article delivery and unloading device and more particularly to a system which conveys and automatically unloads articles. The system may employ a plurality of vehicles which convey articles and selectively deliver them to different unloading chutes which may be located on either side of the vehicle.

Each vehicle is adapted to support and deliver an article and is mounted for movement along a conveyor line. The vehicle has a wheel for rolling contact with a stationary track and a drive wheel for frictional contact with a rotating shaft. A means is provided to bias the drive wheel so that its axis of rotation is angled with respect to the longitudinal axis of the rotating shaft.

Each vehicle includes a substantially horizontal upper platform which acts as a support for an article being carried thereon. The platform is adapted to be inclined selectively to one side or the other of the vehicle but is maintained in the horizontal position by a locking device. As the vehicle approaches an unloading chute, the locking device is automatically unlocked and the platform is pivoted to one of its two inclined positions so that the article being carried thereon is allowed to slide off of the vehicle into the chute.

For the purpose of illustrating the invention, there is shown in the drawings a form which is presently preferred; it being understood, however, that this invention is not limited to the precise arrangements and instrumentalities shown.

FIG. 1 is a cross sectional view of a vehicle and track system constructed in accordance with the principles of the present invention.

FIG. 2 is a side plan view of the vehicle and track shown in FIG. 1.

FIG. 3 is a cross sectional view taken along the lines 3—3 in FIG. 2.

FIG. 4 is a cross sectional view taken along the lines 4—4 in FIG. 3.

FIG. 5 is a cross sectional view taken along the lines 5—5 in FIG. 1.

Referring to the drawings in detail, wherein like numerals indicate like elements, there is shown a preferred embodiment of the present invention. The system includes a conveyor line having a rail 1, only a portion of which is shown in FIG. 1. A drive shaft 2 is disposed parallel to and below rail 1. Drive shaft 2 is supported by suitable spaced bearings and rotates about its longitudinal axis.

A vehicle designated generally as 21 is adapted to be conveyed along the conveyor line and includes a drive wheel 3 which is in frictional contact with the drive shaft 2. The vehicle 21 applies a force to the drive wheel 3 against drive shaft 2 which is a result of the eccentric moment created by the weight of the vehicle 21 and any articles 9 supported thereby. When the friction between the drive wheel 3 and the drive shaft 2 is at a certain angle, and with the drive shaft 2 rotating, an effect is attained in the same manner as a screw effect with the result that the vehicle 21 is moved forward or backward.

The vehicle 21 also includes a plurality of driven wheels 4, 4' and 5 which are rotatably supported on a main vehicle frame 7. The driven wheel 4 rotates at its periphery on the top edge of track 1. Driven wheel 4' is in rolling contact with the right vertical surface of the track 1 so as to prevent the vehicle 21 from rotating off the track by rotation in a counter clockwise direction as viewed in FIG. 1. Wheel 5 functions as a guide roller and is normally inoperative. However, if for some reason the vehicle 21 is moved to the right as viewed in FIG. 1 wheel 5 will contact the vertical left side of track 1 thereby preventing the vehicle from derailing.

The drive wheel 3 is supported by a bracket 3' which in turn is rotatably supported by the main vehicle frame 7. Bracket 3' also supports a sensor roller 6 at its lower end. Sensor roller 6 is adapted, when contacting a fixed object along the conveyor line, to rotate bracket 3' to thereby change the angle $\theta$ between the axis of rotation of drive wheel 3 and the longitudinal axis of drive shaft 2. A spring, not shown, biases the drive wheel 3 to the drive position shown in FIGS. 1 and 2.

Each vehicle 21 also includes an article support platform 8. As shown in FIG. 1, platform 8 is mounted adjacent the top of the main vehicle frame 7 and is adapted to be inclined toward either side of the vehicle. An article designated as 9 is shown in the figures being carried by the vehicle 21.

The platform inclining system of the invention includes a sprocket chain 10, sprocket wheels 11 and 11', a lever arm 12 and an arm attachment 12'. The sprocket wheel 11 is rotatably mounted to the vehicle frame 7 by way of a central shaft $a$. Also rigidly connected to central shaft $a$ is the article support platform 8 such that movement of the sprocket wheel 11 causes the platform 8 to rotate therewith. Also mounted on the vehicle frame 7 is an axle $c$ which is parallel to but beneath the plane of shaft $a$. Sprocket wheel 11' is rotatably mounted on axle $c$ and sprocket chain 10 extends around and between sprocket wheels 11 and 11' as shown in FIG. 1. It should be readily apparent that by this arrangement, movement of sprocket wheel 11' causes similar rotational movement of sprocket wheel 11 and platform 8. It should also be readily apparent that in view of the fact that sprocket wheel 11' is somewhat larger than sprocket wheel 11, a small amount of rotational movement of sprocket 11' causes a proportionally larger amount of rotational movement of sprocket wheel 11 and platform 8.

As shown best is FIG. 5, the arm attachment 12' is rigidly secured to the sprocket wheel 11' for rotational movement therewith. In addition, the lever arm 12 is pivotally attached to the arm attachment 12' by way of pivot pin $b$. It should be readily apparent, therefore, that movement of lever arm 12 upwardly or downwardly as viewed in FIG. 1 will cause platform 8 to incline to the right or the left thereby allowing the article 9 to slide off of the platform into one of the chutes 20. Stops 18 prevent platform 8 from rotating past the position shown in FIG. 1 where the platform is aligned substantialy with the chute 20.

In order to prevent the accidental discharge of articles from the vehicle 21, the system includes a locking device which maintains the platform 8 in its horizontal position until such time as it is desired to rotate the platform. This locking device is constructed in the following manner.

As shown most clearly in FIGS. 4 and 5, a substantially cylindrical sleeve 22 is rigidly mounted to the vehicle frame 7. Pin 13 is fitted into the sleeve 22 and is freely slidable in the horizontal direction as viewed in FIGS. 2 and 4. The midpoint of a lever 14 is pivotally mounted to the vehicle frame 7 at pivot point $d$ such that the bottom end of lever 14 abuts one end of pin 13. A spring 15 biases the lower end of lever 14 toward the lever arm 12 such that the lower end of lever 14 forces pin 13 to contact lever arm 12.

A second sleeve 23 is also rigidly mounted to truck frame 7 at a location slightly above first sleeve 22. Locking pin 16 is freely slidable within sleeve 23 and has its forward end pivotally connected at pivot point $e$ to the upper end of lever 14. The other end of locking pin 16 is adapted to extend beyond the end of sleeve 23. A locking guide member 17 which is rigidly connected to the platform 8 extends downwardly toward and terminates adjacent the end of sleeve 23. The locking guide member 17 has an opending at the lower end thereof into which the end of locking pin 16 is adapted to be inserted. When the pin 16 is inserted into the opening in member 17, the platform 8 is locked so that it is maintained in its horizontal position.

The above-described device operates as follows. The eccentric moment about the contact point of the driven wheel 4 and the rail 1 and caused by the weight of the vehicle 21 and article 9 forces drive wheel 3 into contact with the drive shaft 2. The interaction between drive shaft 2 and drive wheel 3 has a screw effect causing the vehicle to be propelled. The running speed of the vehicle depends on the angle $\theta$ between the axis of drive wheel 3 and the axis of drive shaft 2. This may be changed by sensor roller 6 engaging a fixed element preferably having an increasing gradient. As a result, the vehicle can be automatically slowed down as it approches a discharge chute 20. Similarly, by reducing the gradient in the other direction the vehicle automatically accelerates after it passes the discharge chute 20.

As described above, the article support platform 8 is mounted such that it can be inclined toward either side of the vehicle. Before the vehicle arrives at a prescribed position, the locking pin 16 is inserted into the opening of the locking guide element 17 and, as a result, the platform 8 is prevented from rotating and is maintained in its horizontal position.

Located adjacent each of the chutes 20 is a stop member 19 (see FIG. 2). As the vehicle approaches the chute 20, the free end of lever arm 12 contacts the stop member 19 and lever arm 12 is rotated rearwardly about pivot pin $b$. As lever arm 12 is moved rearwardly, it contacts and forces pin 13 rearwardly which in turn abuts and causes lever 14 to rotate clockwise against the force of spring 15 (as viewed in FIG. 4). As lever 14 rotates clockwise, it pulls locking pin 16 forwardly thereby removing if from the opening in locking guide member 17. This frees the platform 8 from its locked horizontal position.

As the vehicle continues moving along the track, lever arm 12 is swung upwardly or downwardly by the inclined face of the stop member 19. This causes lever arm 12 to rotate sprocket wheel 11' which through chain 10 also causes sprocket wheel 11 to rotate. And since sprocket wheel 11 is rigidly secured to the platform 8, platform 8 is also rotated until the bottom thereof is stopped by the stop members 18. At this point, the article 9 being carried by the vehicle slides off of the platform 8 into the chute 20.

After the article 9 is discharged into the chute 20, the vehicle continues its travel. At some point further down the track, a second stop member (not shown) having an inclined surface, will engage the end of lever arm 12 and rotate the same to return the platform 8 to its horizontal position. Since the locking pin 16 is continuously biased rearwardly by spring 15, when the platform 8 is returned to its horizontal position, the locking pin 16 will be in agreement with the opening in the locking guide member 17 and will automatically insert itself therein to again lock the platform 8 in its horizontal position.

In the foregoing embodiment, the locking pin 16 for maintaining the platform 8 in the horizontal position and the sprocket wheel 11' for inclining the platform are simultaneously actuated by the lever arm 12 engaging a single stop member 19. It is, however, possible to arrange two stop members 19 so that one operates the locking pin 16 and the other operates the sprocket wheel 11'. When two stop members 19 are utilized, the operating times of the pin 16 and the sprocket wheel 11' are appropriately deviated from each other by adjusting the relative positions of the two stop members 19.

It should be readily apparent that the present invention can also be used to selectively deliver different articles to different unloading chutes. This can be easily accomplished by varying the length of the end of lever arm 12 which is adapted to strike stop member 19 and/or by changing the position of stop member 19 relative to the conveyor line. In this way, vehicles with short lever arms 12 will pass certain unloading stations without unloading their articles and will only unload at stations where the stop member 19 is close enough to the track to be engaged by the end of lever arm 12. Furthermore, it should be readily apparent that the selection of the unloading chutes on either side of the track is determined by the angle of inclination of the stop members 19. The stop member 19 can be used to force the end of lever arm 12 either upwardly or downwardly. As viewed in FIG. 1, if lever arm 12 is forced upwardly, the platform 8 will be inclined downwardly to the right and if lever arm 12 is forced downwardly, platform 8 will be inclined downwardly to the left.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising:
   a single track conveyor line;
   at least one unloading station positioned adjacent to said conveyor line;
   a stop means positioned along said conveyor line adjacent said unloading station;
   at least one vehicle supported by said conveyor line for movement along said conveyor line;
   said vehicle including a frame means;
   at least one carrier wheel supported by said frame means and adapted for rolling contact with said single track;
   a drive wheel supported by said frame means below the elevation of said carrier wheel and adapted to be driven by a drive means carried by said conveyor for driving said frame means along said track;

said vehicle including an article supporting platform and means for rotatably mounting said supporting platform to said frame means;

means for maintaining said platform in a substantially horizontal position;

an actuator means mounted on said vehicle; and said actuator means cooperating with said stop means when said vehicle is adjacent said unloading station for deactuating said maintaining means and for rotating said platform into a inclined position whereby an article is allowed to slide off of said platform.

2. Apparatus in accordance with claim 1 wherein said mounting means permits the platform to be rotated to be inclined toward either side of said vehicle.

3. Apparatus in accordance with claim 2 wherein said means for maintaining said platform in said horizontal position includes means for preventing rotation of said platform.

4. Apparatus in accordance with claim 1 wherein said stop means includes an inclined surface adapted to cooperate with said actuator means.

5. Apparatus in accordance with claim 1 wherein said single track conveyor line includes a horizontally disposed drive shaft, said drive shaft being rotatable about its longitudinal axis and being supported below said single track.

6. Apparatus in accordance with claim 5 wherein said drive wheel is adapted for frictional contact with said shaft.

7. A driverless wheeled vehicle adapted to be conveyed along a conveyor comprising:

a vehicle frame means;

means carried by said frame means and being adapted to cooperate with a conveyor for conveying said vehicle;

a platform means being adapted to carry an article thereon;

means for rotatably mounting said platform means on said frame means;

means associated with said platform means for maintaining said platform means in a substantially horizontal position;

an actuator means for selectively deactivating said maintaining means and for moving said platform into an inclined position whereby said article is allowed to slide off of said platform;

said actuator means including an arm extending from said vehicle;

said arm being rotatable about a first axis for deactivating said maintaining means; and said arm being rotatable about a second axis for rotating said platform into an inclinded position.

8. A vehicle in accordance with claim 7 wherein said platform means is rotatably mounted on said frame means such that it can be inclined toward either side of said vehicle.

9. A vehicle in accordance with claim 8 wherein said means for maintaining includes a means for preventing said platform means from rotating.

10. Apparatus in accordance with claim 1 wherein said track includes a generally horizontal member interconnected with a generally vertical member.

11. Apparatus in accordance with claim 10 wherein one carrier wheel is in rolling contact with an upper horizontal surface of said vertical member and a second carrier wheel is in rolling contact with a vertical surface of said vertical member.

12. Apparatus in accordance with claim 11 wherein said first and second carrier wheels are rotatable about a single vertical axis.

13. A vehicle in accordance with claim 7 wherein said platform mounting means includes a shaft rotatably carried by said frame means and said platform is fixedly secured to said shaft.

14. A vehicle in accordance with claim 13 including a first sprocket wheel fixedly secured to said shaft, an axle rotatably carried by said frame below the elevation of said shaft, a second sprocket wheel fixedly secured to said axle, a sprocket chain extending around and between said first and second sprocket wheels, and means for connecting said arm to said axle whereby the rotation of said arm about said second axis rotates said platform.

15. A vehicle in accordance with claim 7 wherein said maintaining means includes a locking member extending from said platform, a locking pin movably carried by said frame for engaging said locking member, and means for disengaging said locking pin from said locking member, said disengaging means being activated by the rotation of said arm about said first axis.

16. A vehicle in accordance with claim 15 wherein said disengaging means includes a lever pivotable about a pivot point, a portion of said lever on one side of said pivot point being coupled to said locking pin, the other side of the lever being biased toward said arm for engaging said locking pin with said locking means, and means cooperating with the arm for rotating the lever and for disengaging said locking pin from said locking member.

* * * * *